United States Patent
Shah

(10) Patent No.: US 7,925,932 B1
(45) Date of Patent: Apr. 12, 2011

(54) METHOD AND APPARTUS FOR DETECTING AN APPLICATION PROCESS FAILURE

(75) Inventor: Veeral Prabodhachandra Shah, Maharashua (IN)

(73) Assignee: Symantec Operating Corporation, Mountain View, CA (US)

( * ) Notice: Subject to any disclaimer, the term of this patent is extended or adjusted under 35 U.S.C. 154(b) by 739 days.

(21) Appl. No.: 10/945,509

(22) Filed: Sep. 20, 2004

(51) Int. Cl.
*G06F 11/00* (2006.01)

(52) U.S. Cl. ............ 714/47; 714/48; 717/127

(58) Field of Classification Search .......... 714/47, 714/48, 38; 717/127
See application file for complete search history.

(56) References Cited

U.S. PATENT DOCUMENTS

| | | | |
|---|---|---|---|
| 5,748,882 A * | 5/1998 | Huang | 714/47 |
| 6,185,702 B1 * | 2/2001 | Shirakihara et al. | 714/38 |
| 6,704,806 B1 * | 3/2004 | Decker | 719/324 |
| 6,883,170 B1 * | 4/2005 | Garcia | 718/1 |
| 6,922,796 B1 * | 7/2005 | Matena et al. | 714/48 |
| 7,114,104 B1 * | 9/2006 | Bennett | 714/38 |
| 7,124,403 B2 * | 10/2006 | Price et al. | 717/127 |
| 2003/0084377 A1 * | 5/2003 | Parks et al. | 714/38 |

* cited by examiner

*Primary Examiner* — Marc Duncan
(74) *Attorney, Agent, or Firm* — Campbell Stephenson LLP

(57) ABSTRACT

A method and apparatus for detecting an application process failure is described. In one embodiment, a process membership manager is opened with a first process. This action by the first process causes an instance indicia associated with the process membership manager to be assigned a first predefined value. The first process (i.e., parent process) then forks (or creates) a second process (i.e., child process). Once the second process is created, the instance indicia is changed to a second predefined value. In the event the second process fails, the second predefined value will change to reflect the process failure. Consequently, this change of the second predefined value causes a message, which provides notice of the second process failure, to be sent to a process membership manager.

10 Claims, 2 Drawing Sheets

METHOD AND APPARTUS FOR DETECTING AN APPLICATION PROCESS FAILURE

BACKGROUND OF THE INVENTION

1. Field of the Invention

Embodiments of the present invention generally relate to application process monitoring systems, and more particularly, to a method and apparatus for detecting the failure of an application process.

2. Description of the Related Art

Modern computer networks generally comprise a plurality of user computers connected to one another and to a computer server via a communication network. To provide redundancy and high availability of the information in applications that are executed upon the computer server, multiple computer servers may be arranged in a cluster, i.e., forming a server cluster. Such server clusters are available under the trademark VERITAS CLUSTER SERVER from Veritas Software Corporation at Mountain View, Calif. In a server cluster, a plurality of servers communicate with one another to facilitate failover redundancy such that when software or hardware, i.e., computer resources, become inoperative on one server, another server can quickly execute the same software that was running on the inoperative server substantially without interruption. As such, user services that are supported by a server cluster would not be substantially impacted by inoperative server or software.

High Availability (HA) is the accessibility of resources in a computer system in the event of a software component failure within the system. In existing HA software, a high availability daemon (HAD) frequently monitors an application process to verify its "on-line" or operational status. This monitoring process is periodic and can be configured by adjusting a monitoring frequency parameter. Thus, the maximum amount of monitoring time required to detect the failure of an application process is equal to the time interval of the monitoring cycle. Once the HAD determines that an application failure has occurred, a failover of the application can be initiated, i.e., the application can be restarted on another or same server. In order to reduce the time of application failure detection, and thus improve the monitoring process, the monitoring frequency may be increased. However, this frequency of monitoring cycles places a burden on the central processing unit (CPU) of the server.

Thus, there is a need in the art for a more efficient method for detecting an application process failure.

SUMMARY OF THE INVENTION

The invention provides a method and apparatus for detecting an application process failure. In one embodiment, a process membership manager is opened with a first process. This action by the first process causes an instance indicia associated with the process membership manager to be assigned a first predefined value. The first process (i.e., parent process) then forks (or creates) a second process (i.e., child process). Once the second process is created, the instance indicia is changed to a second predefined value. In the event the second process fails, the second predefined value will change to reflect the process failure. Consequently, this change of the second predefined value causes a message, which provides notice of the second process failure, to be sent to a process membership manager. As such, failover processing may be instantly begun upon failure without using CPU cycles to continuously monitor the software execution.

BRIEF DESCRIPTION OF THE DRAWINGS

The following detailed description makes reference to the accompanying drawings that are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
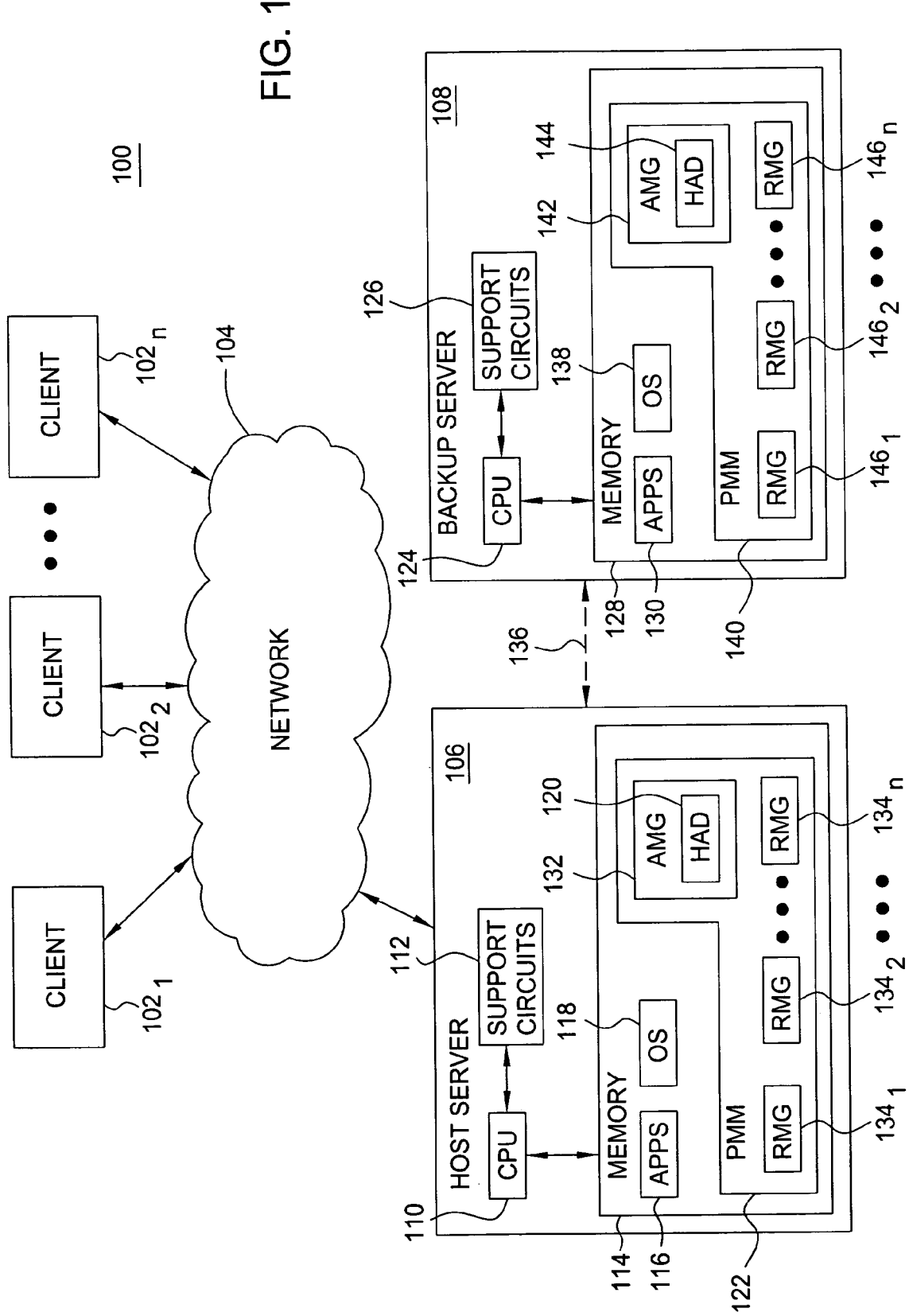
FIG. 1 depicts a block diagram of a computer network that operates in accordance with the present invention.

FIG. 1 depicts a computer network 100 in which the embodiments of the present invention may be utilized. This figure only portrays one variation of the myriad of possible network configurations. For example, FIG. 1 could have depicted numerous host and backup servers 106, 108. For simplicity and clarity, one host server 106 and one backup server 108 are depicted and described below. The invention, as shall be discussed below, is a method and apparatus for detecting an application process failure.

The computer network 100 comprises a plurality of client computers, $102_1, 102_2 \ldots 102_n$, that are connected to one another through a conventional data communications network 104 (e.g., the Internet, a wide area network, or a local area network). A host server 106 is coupled to the communication network 104 to supply application and data services as well as other resource services to the clients $102_1, 102_2 \ldots 102_n$. The host server 106 is coupled to a backup server 108 via a private network connection 136 (shown) or a communication network 104.

The host server 106 comprises at least one central processing unit (CPU) 110, support circuits 112, and memory 114. The CPU 110 may comprise one or more conventionally available microprocessors. The support circuits 112 are well known circuits used to promote functionality of the CPU 110. Such circuits include, but are not limited to, a cache, power supplies, clock circuits, input/output (I/O) circuits and the like. The memory 114 is coupled to the CPU 110 and may comprise random access memory, read only memory, removable disk memory, flash memory, and various combinations of these types of memory.

The memory 114 is sometimes referred to as main memory and may, in part, be used as cache memory or buffer memory. The memory 114 generally stores the operating system 118 of the host server 106 and various types of application software 116. The operating system 118 may be one of a number of commercially available operating systems such as, but not limited to, SOLARIS from SUN Microsystems, Inc., AIX from IBM Inc., HP-UX from Hewlett Packard Corporation, LINUX from Red Hat Software, WINDOWS 2000 from Microsoft Corporation, and the like.

A process membership manager (PMM) 122, which is a high availability software component responsible for storing membership groups 132, 134 and detecting application process failures, is stored in the memory 114 of all host and backup servers 106, 108, i.e., stored on the nodes of the cluster. The membership groups 132, 134 may comprise a single administrative membership group 132 and a plurality of regular membership groups $134_{1...n}$. These membership groups 132, 134 are created in the PMM 122 by a high availability daemon (HAD) 120. The HAD 120 is run on the host server 106 as well as the backup server 108 (e.g., HAD 144). Thus, the HAD 120 is completely informed of the application process model (i.e., the process distribution across various nodes). An application process that joins an administrative membership group 132 is called an administrative member whereas an application process that joins a regular membership group 134 is identified as a regular member. Typically, conventional application processes and instances join the regular membership groups 134. Conversely, a HAD on a given node (e.g., HAD 144) registers with its respective administrative membership group (e.g., administrative membership group 142). Information regarding the membership groups, their respective members, and any membership changes are stored on several different nodes (e.g., the host server 106, the backup server 108, and the like) of the network 100. Furthermore, this data is continuously updated and replicated among the various nodes by the PMM 122 via the private network connection 136. A HAD 120 is a specific type of daemon designed for monitoring application processes. Specifically, the HAD 120 determines if the application processes are on-line and functioning properly. The HAD 120 also initiates a failover process in the event of an application process failure.

The administrative members receive notifications of certain events, which include, but are not limited to, 1) when a regular membership group 134 is created, 2) when a regular membership group 134 is deleted, 3) when an application process joins either a regular membership group 134 or the administrative membership group 132, and 4) when an application process leaves either a regular membership group 134 or the administrative membership group 132 due to an application process failure (or because of process deregistration from a group).

The backup server 108 is configured in a manner similar to the host server 106. Specifically, the backup server 108 comprises a CPU 124, support circuits 126, and memory 128. The memory 128 stores all of the information that is supplied as backup information from the host server 106 and contains a variety of software applications 130, an operating system 138, and a PMM 140. The PMM 140 is responsible for storing the administrative group 142 and the regular membership groups $146_{1...n}$, and detecting application process failures. A HAD 144, which monitors application processes in the backup server 108, is stored in the administrative membership group 142. Although the host server 106 and the backup server 108 may be connected through the network 104 (not shown), these two servers are typically coupled by a private network connection 136 in order to facilitate the rapid transfer of backup information and restoration of this information when necessary.

Figure 2:
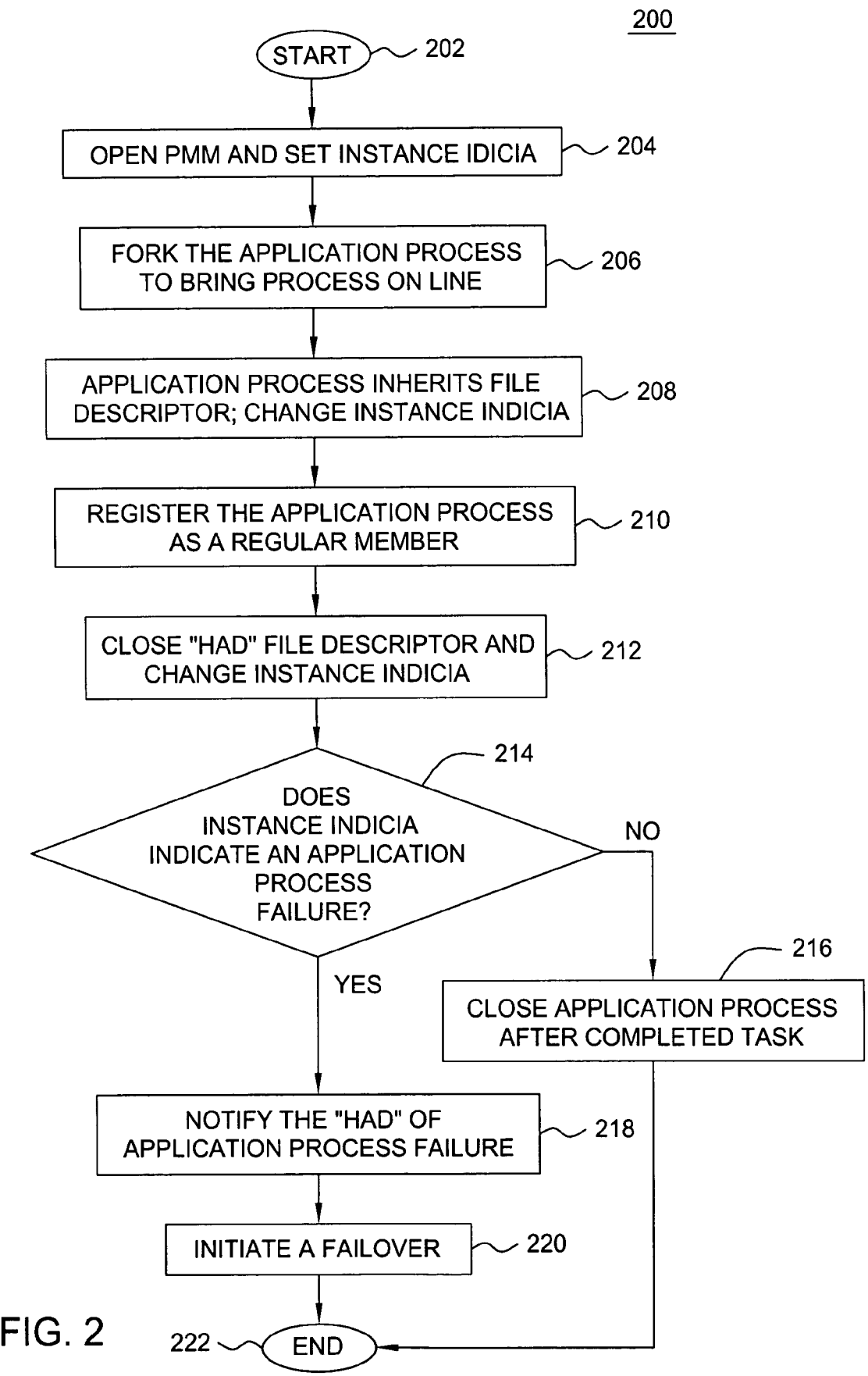
FIG. 2 depicts a flow diagram of a method for detecting an application process failure in accordance with the present invention.

FIG. 2 is a flow diagram depicting an exemplary embodiment of a method 200 for detecting the failure of an application process in accordance with the invention. Aspects of the method 200 may be understood with reference to FIG. 1. The method 200 begins at step 202. At step 204, the HAD 120 (i.e., a first process) opens the Process Membership Manager (PMM) device 122 whenever an application process is to be brought on-line. After opening the PMM 122, the HAD 120 acquires the file descriptor of the PMM 122. At this time, an instance indicia is set to a first predefined value by the operating system 118. The instance indicia value reflects the number of processes that are utilizing or are associated with a particular device (e.g., the PMM 122). The instance indicia is not unlike a usage count utilized in a UNIX based system. At step 206, the HAD acts as a parent process and forks an application process (i.e., a second process). By utilizing this forking technique (i.e., fork system call), the HAD 120 effectively launches the application process (i.e., child process) on-line.

At step 208, the application process inherits the file descriptors of the HAD 120. Notably, one of these file descriptors is the file descriptor associated with the PMM 122. As a result of inheriting this particular file descriptor, the application process causes the operating system to change (i.e., increment) the first predefinied value of the instance indicia to a second predefined value. In this scenario, the usage count in a UNIX based system would have incremented by one, thereby bringing the total count to two (i.e., one each for the HAD and application process).

At step 210, the HAD 120 registers the application process as a regular member belonging to a regular membership group 134. The HAD 120 may accomplish this since it is the parent of the application process and thus, is aware of the application process' process identifier (pid). At step 212, the HAD 120 subsequently closes its file descriptor associated with the PMM 122, thus causing the operating system 118 to change (i.e., decrement) the second predefined value of the instance indicia. In a UNIX based system, the usage count would decrease by one to reflect the parent process closing its file descriptor, which is linked with the PMM 122. Consequently, this scenario would result in the usage count value being reduced to one since the PMM 122 related file descriptor belonging to the application process would be open.

At step 214, a determination is made as to whether the instance indicia indicates a failure of the application process. It is important to note that step 214 is a continuous routine that transpires for the "life span" or duration of the application process. If there is no indication of a process failure, then the method 200 continues to step 216. At step 216, the application process is eventually closed after the process has completed its originally assigned task. The method 200 proceeds to step 222 and ends.

Alternatively, if the instance indicia signifies an application process failure, the method 200 proceeds to step 218. At step 218, the PMM 122 receives a message indicating the failure of the application process and subsequently notifies all the administrative members of the application process failure. More importantly, the HAD 120 is able to learn of the application process failure since it is a member of the administrative membership group 132. In a UNIX based system, a process failure is indicated by the usage count attaining a value of zero. After the usage count registers a zero value, the operating system 118 performs a close entry point call (i.e., a message) and forwards it to the PMM 122. This close entry point call informs the PMM 122 of the application process failure. At step 220, the HAD 120 initiates the failover process upon receiving the process failure notification from the PMM 122. At step 222, the method 200 ends.

The present invention provides a process membership manager with the ability to readily detect the failure of an application process. The PMM accomplishes this by receiving a message from the operating system in the event an instance indicia is reduced to a predefined amount (e.g., zero). Since this method of failure detection does not require continuous monitoring and CPU usage, network resource can be utilized for other tasks.

While the foregoing is directed to embodiments of the present invention, other and further embodiments of the invention may be devised without departing from the basic scope thereof, and the scope thereof is determined by the claims that follow.

What is claimed is:

1. A method for initiating a failover process, comprising:
receiving a message from an operating system in response to a failed application process, the failed application process having been forked from a first process, the first process being one of a plurality of administrative members and the failed application process being a regular member in a regular membership group; and
sending a notification of said failed application process to all of the plurality of administrative members in response to receiving said message, wherein said first process commences said failover process in response to said notification.

2. The method of claim 1, wherein said message is a close entry point call.

3. The method of claim 1, wherein said first process and said failed application process are a parent process and a child process, respectively.

4. The method of claim 1, wherein said first process is a high availability daemon.

5. The method of claim 1, further comprising initiating a failover in response to said message.

6. An apparatus for initiating a failover process, comprising:
means for receiving a message from an operating system in response to a failed application process, the failed application process having been forked from a first process, the first process being one of a plurality of administrative members and the failed application process being a regular member in a regular membership group; and
means for sending a notification of said failed application process to all of the plurality of administrative members in response to receiving said message, wherein said first process commences said failover process in response to said notification.

7. The apparatus of claim 6, wherein said message is a close entry point call.

8. The apparatus of claim 6, wherein said first process and said failed application process are a parent process and a child process, respectively.

9. The method of claim 6, wherein said first process is a high availability daemon.

10. The method of claim 6, further comprising initiating a failover in response to said message.

* * * * *